(12) United States Patent
Rickis et al.

(10) Patent No.: US 8,511,329 B1
(45) Date of Patent: Aug. 20, 2013

(54) METERING VALVE

(75) Inventors: Aaron Rickis, Feeding Hills, MA (US); David J. Podgorski, Suffield, CT (US); David L. Chapski, Southwick, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/456,473

(22) Filed: Apr. 26, 2012

(51) Int. Cl.
*F16K 11/07* (2006.01)

(52) U.S. Cl.
USPC ............... 137/15.21; 137/625.3; 137/625.38; 251/206

(58) Field of Classification Search
USPC .............. 251/205–206, 210–211; 137/15.21, 137/625.3, 625.38
See application file for complete search history.

(56) References Cited

U.S. PATENT DOCUMENTS

| | | | |
|---|---|---|---|
| 2,836,198 A * | 5/1958 | McNeill .................... 251/206 |
| 2,964,023 A * | 12/1960 | Meulendyk ............. 137/625.39 |
| 4,109,683 A * | 8/1978 | Strache .................... 137/625.3 |
| 4,215,723 A | 8/1980 | Ichiryu et al. |
| 4,325,412 A * | 4/1982 | Hayner .................... 137/625.65 |
| 4,637,420 A | 1/1987 | Dyer |
| 5,070,898 A | 12/1991 | Jagodzinski et al. |
| 6,397,890 B1 * | 6/2002 | Mickelson et al. ....... 137/625.34 |
| 6,401,446 B1 | 6/2002 | Gibbons |
| 6,666,015 B2 | 12/2003 | Dyer |
| 2004/0025492 A1 | 2/2004 | Griffiths et al. |
| 2007/0199601 A1 * | 8/2007 | Imhof ...................... 137/625.64 |
| 2008/0035225 A1 * | 2/2008 | Tackes et al. ........... 137/625.35 |
| 2008/0296403 A1 | 12/2008 | Futa, Jr. et al. |
| 2011/0023982 A1 | 2/2011 | Griffiths |

OTHER PUBLICATIONS

Ni, et al., Compensation Force CFD Analysis of Pressure Regulating Valve Applied in FMU of Engine and System Controls, 2011-01-2641, Copyright 2011 SAE International, 7 pages.
Anderson, et al., Mathematical Modelin of a Two Spool Flow Control Servolvalue Using a Pressure Control Pilot, Transactions of the ASME, Copyright 2002 by ASME, vol. 124, Sep. 2002, pp. 420-427.

* cited by examiner

*Primary Examiner* — John Bastianelli
(74) *Attorney, Agent, or Firm* — Cantor Colburn LLP (57) ABSTRACT

A metering valve assembly includes a metering valve sleeve and a metering valve spool. The metering valve sleeve includes an inlet window set and an outlet window set with a first outlet window having a first logarithmic contour and a second outlet window having a second logarithmic contour. A ratio of an inner width of the first outlet window to an inner length of the first outlet window is between 1.48 and 1.52. A ratio of an inner width of the second outlet window to an inner length of the second outlet window is between 2.21 and 2.29. The metering valve spool includes first, second, and third cylindrical portions. The metering valve spool is configured to move bi-directionally along a longitudinal axis of the metering valve sleeve and control fluid flow between the inlet window set and the outlet window set relative to the first, second, and third cylindrical portions.

20 Claims, 6 Drawing Sheets

METERING VALVE

BACKGROUND OF THE INVENTION

The present invention is related to fuel flow control, and more specifically to a metering valve.

Fuel flow control in systems such as gas turbines includes controlling and maintaining pressures within a fuel control housing of a fuel control. To control and maintain pressures within the fuel control housing, often the fuel flow is increased and decreased as well as diverted via a combination of control valves. A displacement pump pressurizes fuel prior to its metering and subsequent delivery to an engine. The displacement pump is typically sized to ensure an excess flow capacity at all possible operating conditions. The output of the pump is delivered to a fuel metering valve which, in conjunction with a bypassing, pressure regulating valve (PRV), meters the rate of fuel burn flow to the engine. Proper control of a fuel system is based on the consistent operation of all valves within the fuel system. Without consistent valve operation, the fuel system may become unpredictable.

BRIEF DESCRIPTION OF THE INVENTION

Exemplary embodiments include a metering valve assembly that includes a metering valve sleeve and a metering valve spool. The metering valve sleeve includes an inlet window set and an outlet window set. The outlet window set includes a first outlet window having a first logarithmic contour and a second outlet window having a second logarithmic contour. A ratio of an inner width of the first outlet window to an inner length of the first outlet window is between 1.48 and 1.52. A ratio of an inner width of the second outlet window to an inner length of the second outlet window is between 2.21 and 2.29. The metering valve spool includes a first cylindrical portion, a second cylindrical portion, and a third cylindrical portion formed between the first and second cylindrical portions. The metering valve spool is configured to move bi-directionally along a longitudinal axis of the metering valve sleeve and control fluid flow between the inlet window set and the outlet window set relative to the first, second, and third cylindrical portions.

Additional exemplary embodiments include a fuel control that includes a pressure regulating valve section configured to control a metered pressure of fuel and a metering valve section configured to meter a fuel burn flow at the metered pressure. The metering valve section includes a metering valve assembly with a metering valve sleeve and a metering valve spool. The metering valve sleeve includes an inlet window set and an outlet window set. The outlet window set includes a first outlet window having a first logarithmic contour and a second outlet window having a second logarithmic contour. A ratio of an inner width of the first outlet window to an inner length of the first outlet window is between 1.48 and 1.52. A ratio of an inner width of the second outlet window to an inner length of the second outlet window is between 2.21 and 2.29. The metering valve spool includes a first cylindrical portion, a second cylindrical portion, and a third cylindrical portion formed between the first and second cylindrical portions. The metering valve spool is configured to move bi-directionally along a longitudinal axis of the metering valve sleeve and control the fuel burn flow between the inlet window set and the outlet window set relative to the first, second, and third cylindrical portions.

Further exemplary embodiments include a method of installing a metering valve assembly in a fuel control. The method includes inserting a metering valve sleeve into a metering valve section of a fuel control housing. The metering valve sleeve includes an inlet window set and an outlet window set. The outlet window set includes a first outlet window having a first logarithmic contour and a second outlet window having a second logarithmic contour. A ratio of an inner width of the first outlet window to an inner length of the first outlet window is between 1.48 and 1.52. A ratio of an inner width of the second outlet window to an inner length of the second outlet window is between 2.21 and 2.29. A metering valve spool is arranged within the metering valve sleeve. The metering valve spool includes a first cylindrical portion, a second cylindrical portion, and a third cylindrical portion formed between the first and second cylindrical portions. The first cylindrical portion and the second cylindrical portion have a substantially equal first diameter. The third cylindrical portion has a second diameter. A ratio of the first diameter to the second diameter is between 2.52 and 2.63. The metering valve spool is arranged to establish a diametral clearance of 0.0003 and 0.0006 inches (0.000762-0.001524 cm) between an inner diameter of the metering valve sleeve and the first diameter.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
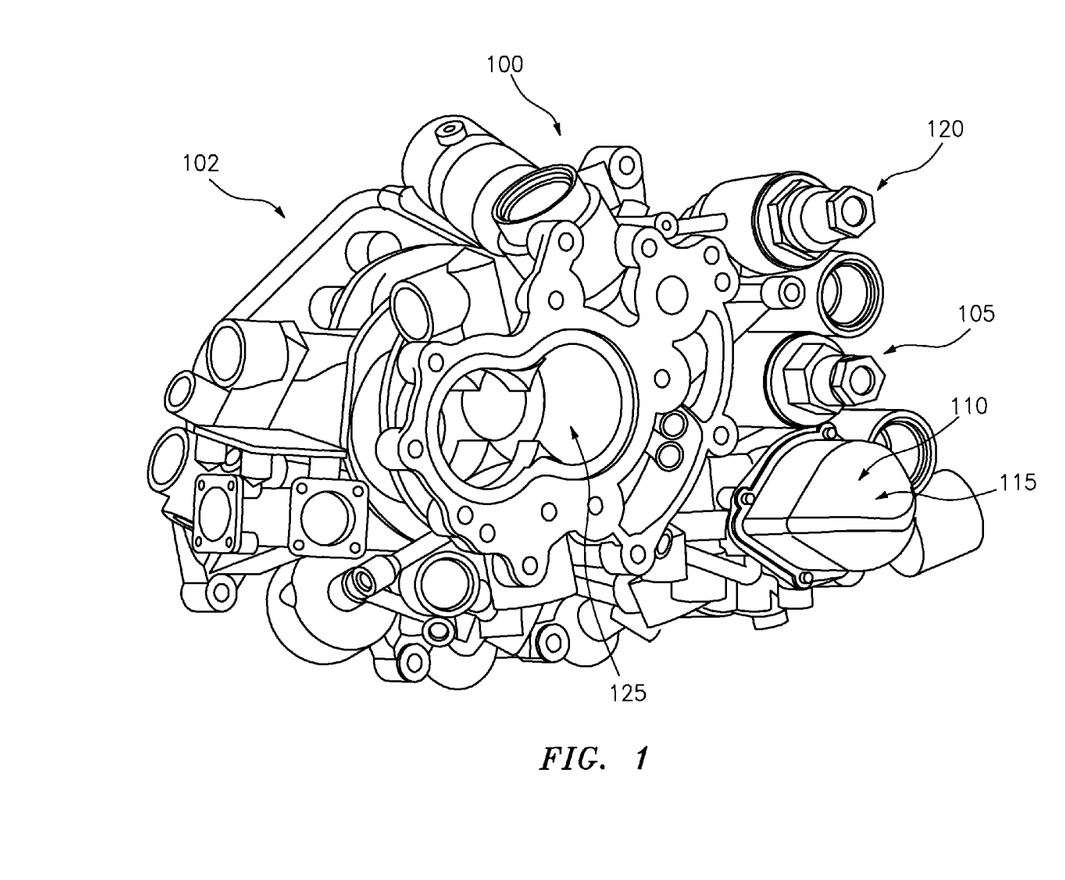
FIG. 1 schematically illustrates a perspective view of a fuel control housing portion for regulating fuel flow.

FIG. 1 schematically illustrates a perspective view of a fuel control housing portion 100 of a fuel control 102 for regulating fuel flow for systems such as aircraft gas turbine engines. In one embodiment, the fuel control housing portion 100 includes a pressure regulating valve section 105, a metering valve section 110, a containment housing section 115 that is generally adjacent to the metering valve section 110, and a servo minimum pressure valve section 120. Other valves, control and feedback features (not depicted) may also be included in the fuel control housing portion 100 or in another portion (not depicted) of the fuel control 102. Fuel flowing into the fuel control housing portion 100 is pressurized in a pump section 125. Pressurized flow is metered in metering valve section 110 before being output as a fuel burn flow at a metered pressure. The pressure regulating valve section 105 sets and controls the metered pressure of the metering valve section 110. The fuel control 102 can also provide fluid pressure for actuators (not depicted), where the servo minimum pressure valve section 120 establishes a minimum pressure and discharges excess flow to the pressure regulating valve section 105.

Figure 2:
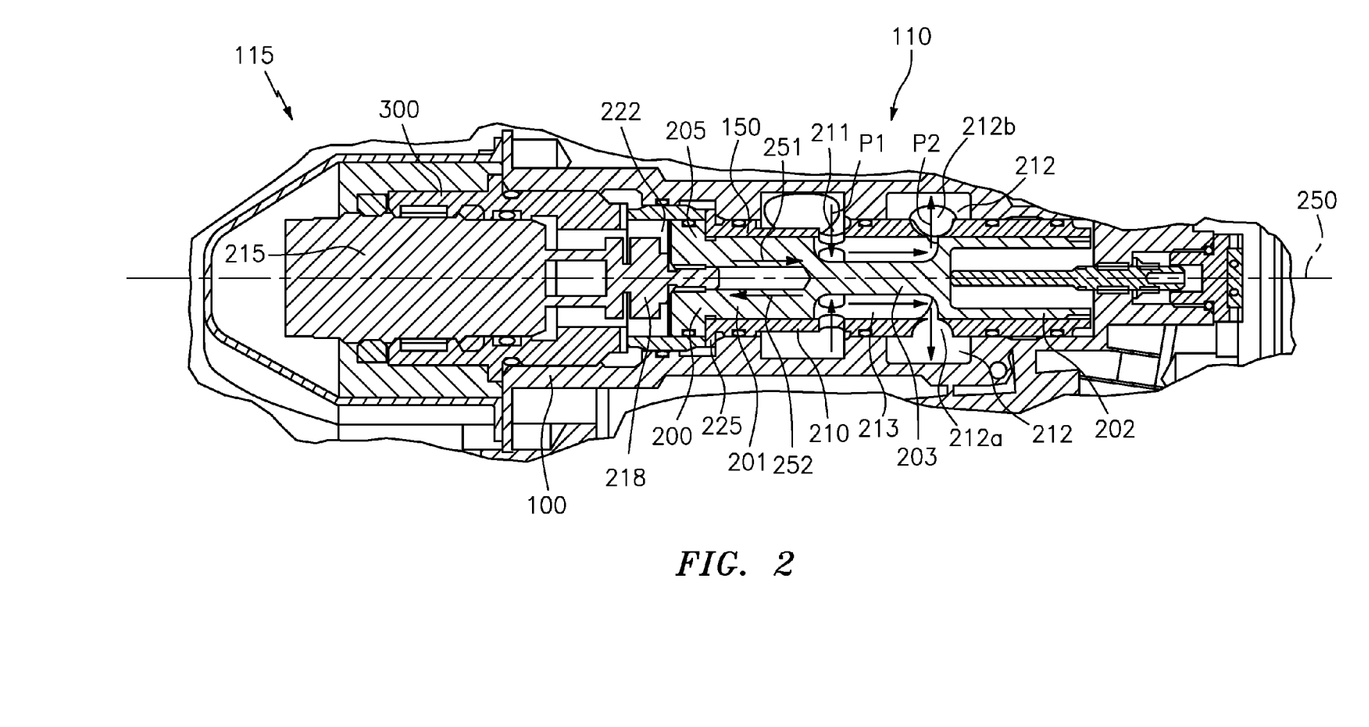
FIG. 2 schematically illustrates a cross-sectional view of a metering valve section and a containment housing section of the fuel control housing portion of FIG. 1.

FIG. 2 schematically illustrates a cross-sectional view of the metering valve section 110 and the containment housing section 115 of FIG. 1 including a metering valve assembly 150 according to an embodiment. The metering valve assembly 150 includes a metering valve spool 200 arranged within a metering valve sleeve 210. The metering valve spool 200 includes a first cylindrical portion 201 and a second cylindrical portion 202. A third cylindrical portion 203 is formed between of the first and second cylindrical portions 201, 202. A differential in diameter between the first and second cylindrical portions 201, 202 and the third cylindrical portion 203 forms a space 213 when the metering valve spool 200 and the metering valve sleeve 210 are concentrically arranged.

In one embodiment, the metering valve sleeve 210 includes an inlet window set 211 and an outlet window set 212. The outlet window set 212 includes a first outlet window 212a and a second outlet window 212b. When the metering valve spool 200 is positioned within the metering valve sleeve 210 such that at least a portion of the space 213 aligns with the inlet and outlet window sets 211 and 212, a fluid, such as fuel, can flow at an inlet pressure P1 at the inlet window set 211 through the space 213 and out of the outlet window set 212 at a metered pressure P2. The metering valve spool 200 can move bi-directionally along longitudinal axis 250 as indicated by arrows 251, 252 to control fuel burn flow between the inlet window set 211 and the outlet window set 212. Movement of the metering valve spool 200 within the metering valve sleeve 210 in the direction of arrow 251 may be limited by a limiting lip 205 of the metering valve spool 200 and a limiting lip 225 of the metering valve sleeve 210. Movement of the metering valve spool 200 within the metering valve sleeve 210 in the direction of arrow 252 along the longitudinal axis 250 may be limited by the containment housing 300. The metering valve sleeve 210 remains fixed with respect to the metering valve section 110.

The containment housing section 115 includes a containment housing 300 configured to retain a linear variable differential transformer (LVDT) 215 in a fixed position with respect to the fuel control housing portion 100. The LVDT 215 provides position feedback for position control of the metering valve spool 200. A translating member 218 extends from the LVDT 215 and couples to an end 222 of the metering valve spool 200 such that axial position and movement of the metering valve spool 200 can be detected by the LVDT 215.

Figures 3A, 3B:
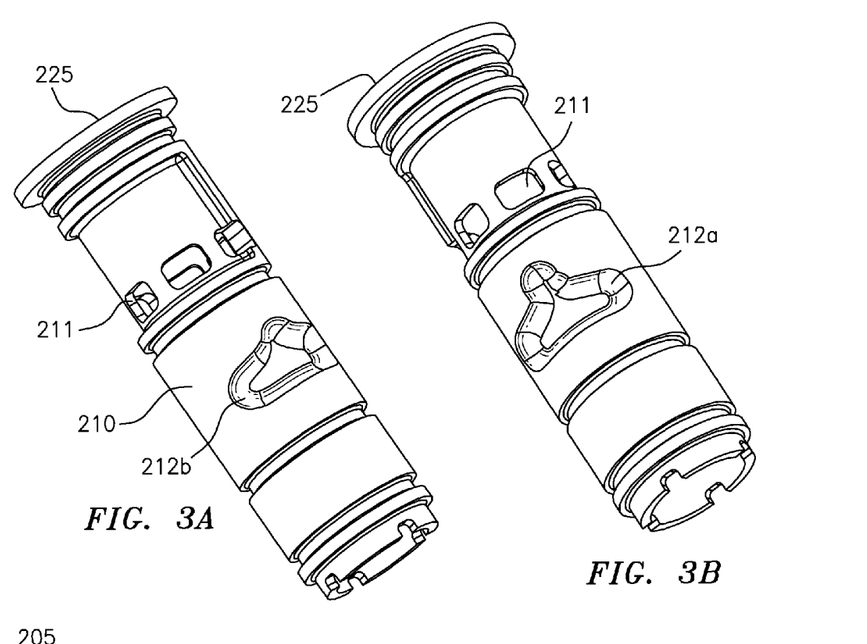
FIG. 3 illustrates a perspective view of a metering valve spool and a metering valve sleeve of FIG. 2.
Figures 3C, 3D:
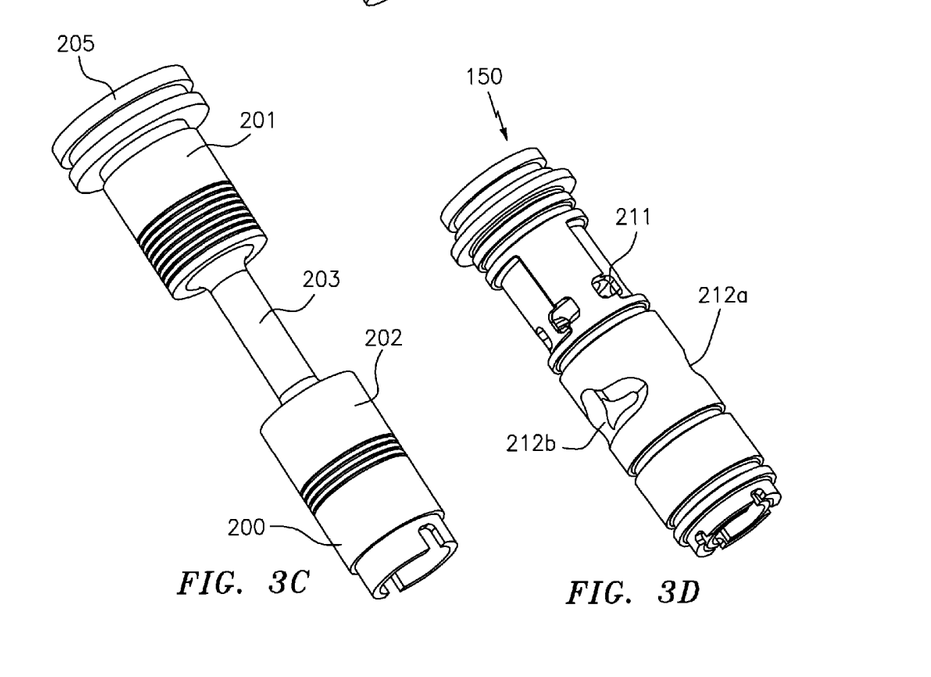

FIG. 3 illustrates a perspective view of the metering valve spool 200 in isolation and the metering valve sleeve 210 in isolation. FIG. 3 further illustrates a perspective view of the metering valve spool 200 and the metering valve sleeve 210 in a concentric arrangement. As depicted in FIG. 3, each of the six inlet windows in the inlet window set 211 has a substantially rectangular shape. The outlet windows 212a, 212b are offset by about 180 degrees relative to each other and have different shapes. In one embodiment, the shapes of the outlet windows 212a, 212b are both defined by logarithmic contours. The logarithmic contours of the outlet windows 212a, 212b may be designed based on a desired flow and pressure in the metering valve section 110 of FIG. 2, and various axial lengths and diameters of the metering valve spool 200 and the metering valve sleeve 210. The logarithmic contours of the outlet windows 212a, 212b provide tightly controlled inlet and outlet flow paths between the inlet window set 211 and the outlet windows 212a, 212b. In an embodiment, the inlet window set 211 is sized to reduce pressure drops within the metering valve assembly 150.

Figure 4:
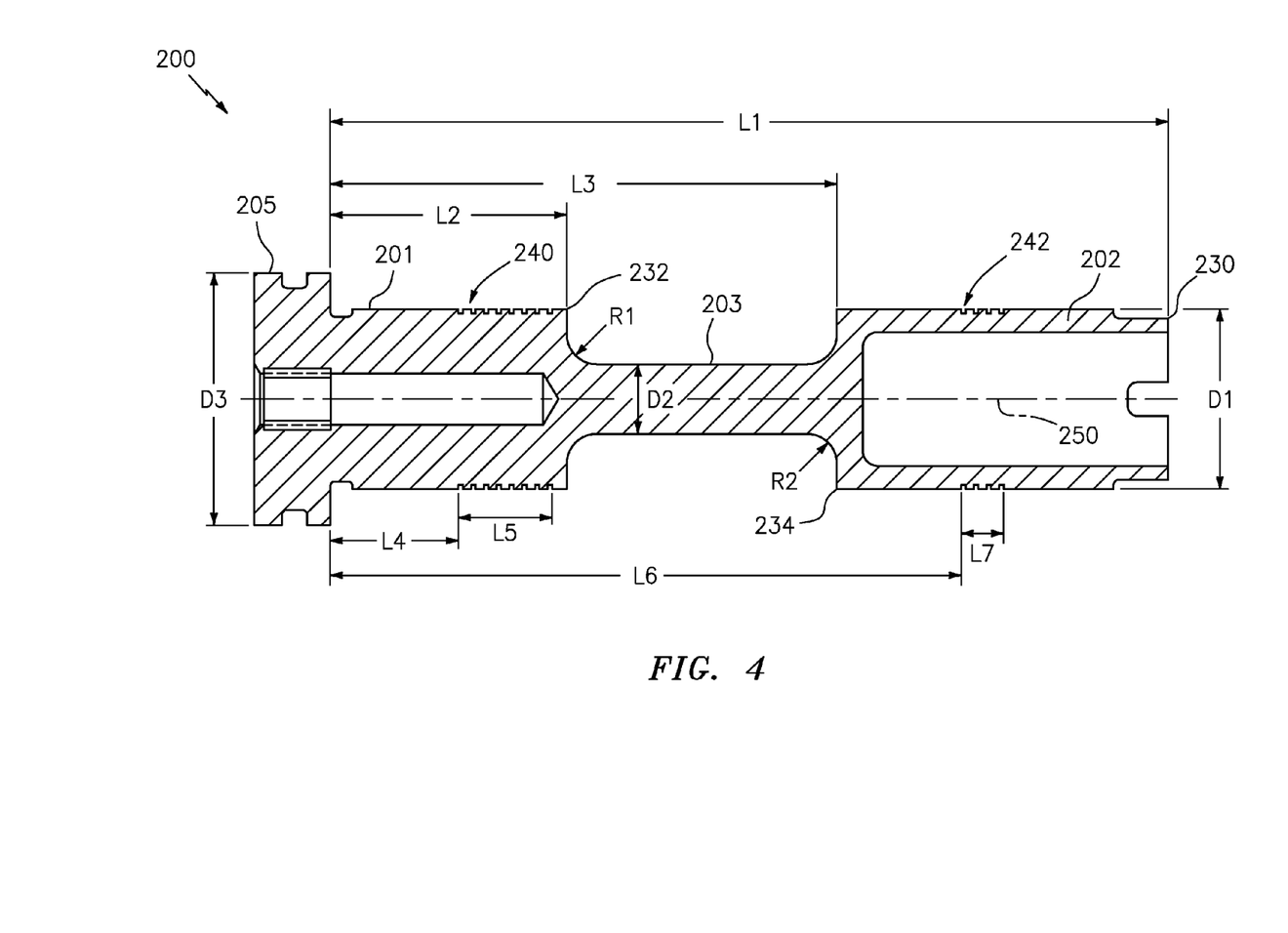
FIG. 4 schematically illustrates a cross-sectional view of the metering valve spool of FIG. 2.

FIG. 4 depicts additional details of the metering valve spool 200 in a cross-sectional view according to an embodiment. The metering valve spool 200 has a length L1 from the limiting lip 205 to a spool end 230 of about 3.325 inches (8.45 cm), a length L2 from the limiting lip 205 to a break edge 232 of the first cylindrical portion 201 of about 0.94 inches (2.39 cm), and a length L3 from the limiting lip 205 to a break edge 234 of the second cylindrical portion 202 of about 2.011 inches (5.11 cm). A ratio of length L1 to length L2 is between 3.51 and 3.56. A ratio of length L1 to length L3 is between 1.65 and 1.66.

The first cylindrical portion 201 includes a first grooved section 240. The second cylindrical portion 202 includes a second grooved section 242. In an embodiment, the first grooved section 240 is a length L4 of about 0.51 inches (1.30 cm) from the limiting lip 205 and includes eight grooves spanning an axial length L5 of about 0.35 inches (0.89 cm). In an embodiment, the second grooved section 242 is a length L6 of about 2.50 inches (6.35 cm) from the limiting lip 205 and includes four grooves spanning an axial length L7 of about 0.15 inches (0.38 cm).

A first radius R1 transitions between the first cylindrical portion 201 and the third cylindrical portion 203. A second radius R2 transitions between the second cylindrical portion 202 and the third cylindrical portion 203. In an embodiment, first radius R1 and second radius R2 are substantially equal and have a value of about 0.125 inches (0.318 cm). The first cylindrical portion 201 and the second cylindrical portion 202 have a substantially equal outer diameter D1 of at least 0.707 inches (1.80 cm). The third cylindrical portion 203 has an outer diameter D2 of about 0.275 inches (0.70 cm). The limiting lip 205 has an outer diameter D3 of about 0.995 inches (2.53 cm). A ratio of outer diameters D1 to D2 is between 2.52 and 2.63. A ratio of outer diameter D3 to D1 is between 1.40 and 1.41.

Figure 5:
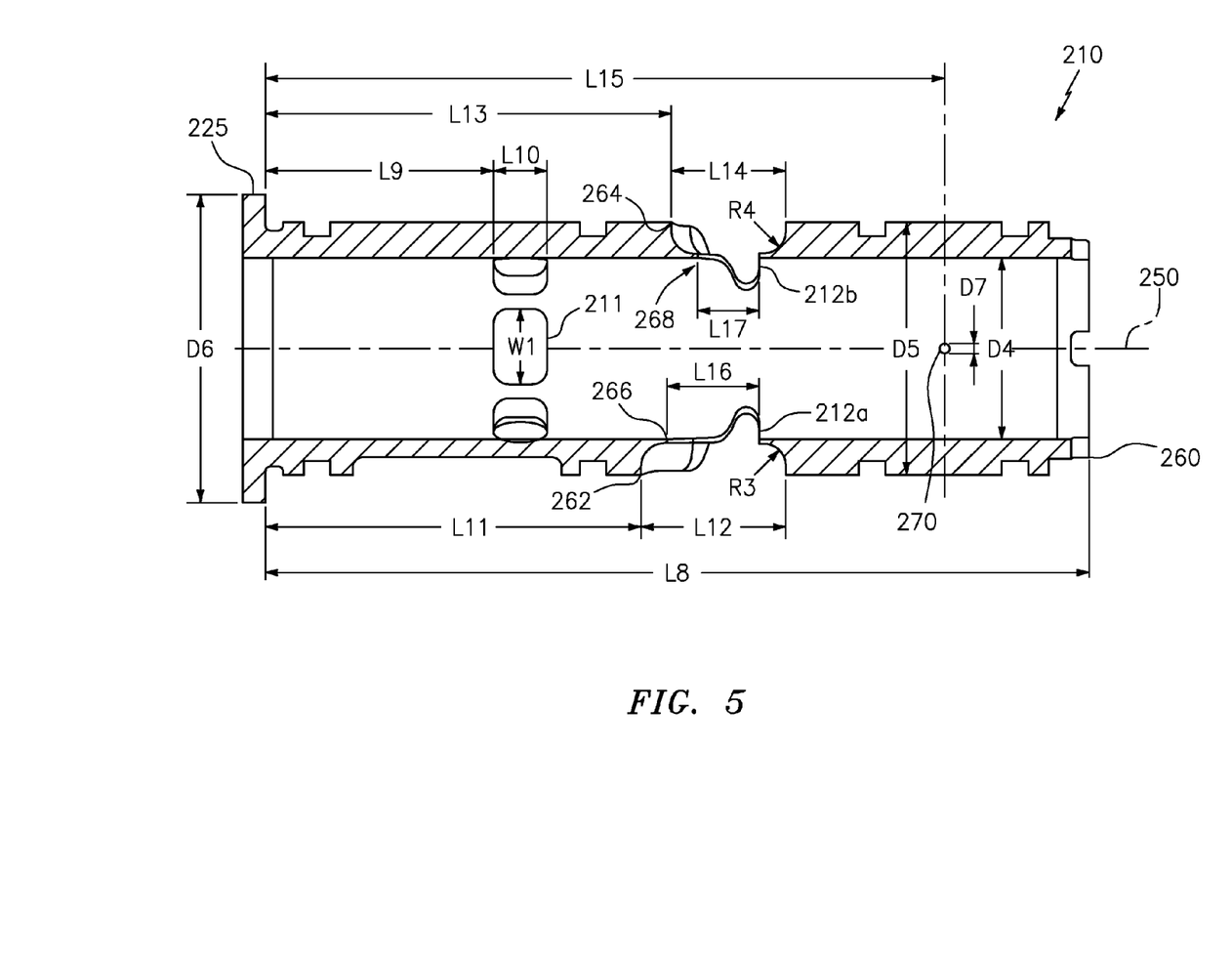
FIG. 5 schematically illustrates a cross-sectional view of the metering valve sleeve of FIG. 2.

FIG. 5 depicts further details of the metering valve sleeve 210 in a cross-sectional view according to an embodiment. The metering valve sleeve 210 has an internal diameter D4 of a maximum of 0.71 inches (1.80 cm). A diametral clearance of 0.0003-0.0006 inches (0.000762-0.001524 cm) is maintained between the internal diameter D4 of the metering valve sleeve 210 and the outer diameter D1 of the metering valve spool 200 of FIG. 4 for each matched set of the metering valve spool 200 and the metering valve sleeve 210. An outer diameter D5 of the metering valve sleeve 210 is about 0.9885 inches (2.51 cm). The limiting lip 225 of the metering valve sleeve 210 has a diameter D6 of about 1.21 inches (3.07 cm).

In an embodiment, the metering valve sleeve 210 has a length L8 of about 3.234 inches (8.21 cm) from the limiting lip 225 to a metering valve sleeve end 260. The inlet window set 211 is located at a length L9 of about 0.898 inches (2.28 cm) from the limiting lip 225. Each of the six inlet windows of the inlet window set 211 has a length L10 of about 0.203 inches (0.516 cm) and a width W1 of about 0.300 inches (0.762 cm). An outer edge 262 of the first outlet window 212a is located at a length L11 of about 1.59 inches (4.04 cm) from the limiting lip 225. The first outlet window 212a has an outer length L12 of about 0.548 inches (1.39 cm) and an inner length L16 of about 0.36 inches (0.914 cm), where a contour radius R3 of about 0.094 inches (0.239 cm) provides a transition from the outer edge 262 to an inner edge 266 of the first outlet window 212a. The inner edge 266 is radially closer to the longitudinal axis 250 than the outer edge 262. An outer edge 264 of the second outlet window 212b is located at a length L13 of about 1.71 inches (4.34 cm) from the limiting lip 225. The second outlet window 212b has an outer length L14 of about 0.428 inches (1.09 cm) and an inner length L17 of about 0.24 inches (0.610 cm), where a contour radius R4 of about 0.094 inches (0.239 cm) provides a transition from the outer edge 264 to an inner edge 268 of the second outlet window 212b. The inner edge 268 is radially closer to the longitudinal axis 250 than the outer edge 264. The metering valve sleeve 210 also includes a pair of apertures 270 located at a length L15 of about 2.666 inches (6.77 cm) from the limiting lip 225. Each of the apertures 270 is offset by about 180 degrees relative to each other and has a diameter D7 of about 0.033 inches (0.084 cm).

A ratio of length L8 to length L9 is between 3.57 and 3.63. A ratio of length L8 to length L11 is between 2.03 and 2.04. A ratio of length L8 to length L13 is between 1.88 and 1.90. A ratio of width W1 to length L10 is between 1.43 and 1.53. A ratio of inner length L16 to length L10 is between 1.73 and 1.82. A ratio of inner length L17 to length L10 is between 1.15 and 1.22. A ratio of outer length L12 to outer length L14 is between 1.15 and 1.42.

Figure 6:
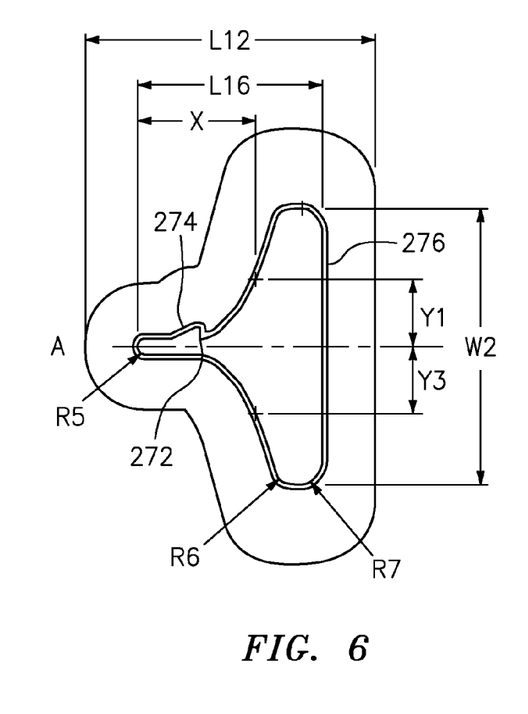
FIG. 6 schematically illustrates a top view of a first outlet window of the metering valve sleeve of FIG. 2.
Figure 7:
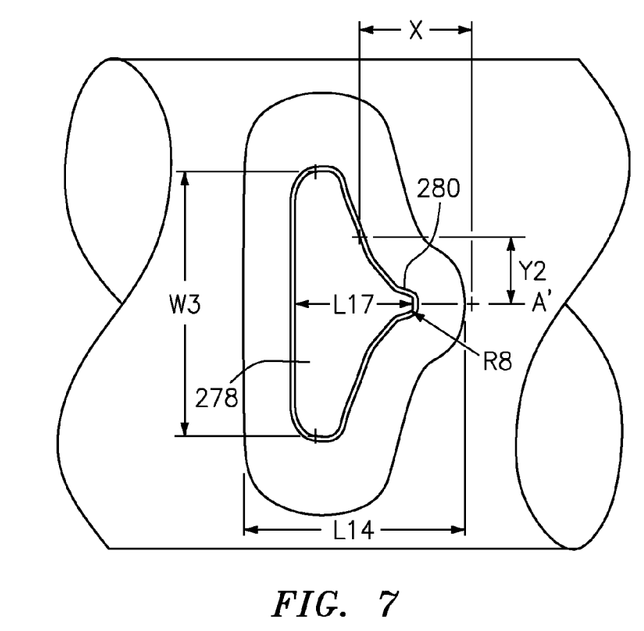
FIG. 7 schematically illustrates a top view of a second outlet window of the metering valve sleeve of FIG. 2.

FIG. 6 schematically illustrates a top view of the first outlet window 212a of the metering valve sleeve 210, and FIG. 7 schematically illustrates a top view of the second outlet window 212b of the metering valve sleeve 210 according to an embodiment. The first outlet window 212a includes a neck portion 272 having a notch 274 above an axis A, where the first outlet window 212a is substantially symmetric about axis A excluding notch 274. The first outlet window 212a also includes a body portion 276. Radius R5 defines curvature of the neck portion 272. Radii R6 and R7 define curvature of the body portion 276. Radius R5 is about 0.01 inches (0.0254 cm). Radius R6 is about 0.03 inches (0.0762 cm). Radius R7 is about 0.05 inches (0.127 cm).

The second outlet window 212b includes a body portion 278 and a neck portion 280 that is substantially symmetric about an axis A'. Radius R8 defines curvature of the neck portion 280 and is about 0.01 inches (0.0254 cm). In an embodiment, the body portion 276 of the first outlet window 212a is substantially equal to the body portion 278 of the second outlet window 212b, as can be seen in greater detail in Table 1. A first logarithmic contour defining points of the first outlet window 212a is provided in Table 1, for X values along axis A, Y1 values above axis A, and Y3 values below axis A. Table 1 also includes a second logarithmic contour defining points of the second outlet window 212b for X values along axis A' and Y2 values about axis A'. Table 2 presents the data of Table 1 in centimeters rather than inches. It will be understood that a manufacturing tolerance can be applied to the values in Tables 1 and 2, as well as for other values described herein. From Tables 1 and 2 and FIGS. 6 and 7, it can be seen that the first outlet window 212a has an inner width W2 of about 0.54 inches (1.37 cm) which is substantially equivalent to an inner width W3 of the second outlet window 212b. A ratio of inner width W2 to inner length L16 is between 1.48 and 1.52. A ratio of inner width W3 to inner length L17 is between 2.21 and 2.29. A ratio of inner width W2 to width W1 is between 1.76 and 1.84.

TABLE 1

Outlet Window Coordinates in Inches

| X | Y1 | Y2 | Y3 |
|---|----|----|----|
| 0 | 0 | | 0 |
| 0 | 0.0135 | | 0.0135 |
| 0.068 | 0.0135 | | 0.0135 |
| 0.12 | 0.0405 | 0 | 0.0135 |
| 0.12 | 0.0135 | 0.0135 | 0.0135 |
| 0.135 | 0.019 | 0.019 | 0.019 |

TABLE 1-continued

Outlet Window Coordinates in Inches

| X | Y1 | Y2 | Y3 |
|---|----|----|----|
| 0.15 | 0.023 | 0.023 | 0.023 |
| 0.17 | 0.039 | 0.039 | 0.039 |
| 0.19 | 0.061 | 0.061 | 0.061 |
| 0.21 | 0.086 | 0.086 | 0.086 |
| 0.23 | 0.129 | 0.129 | 0.129 |
| 0.25 | 0.188 | 0.188 | 0.188 |
| 0.266 | 0.234 | 0.234 | 0.234 |
| 0.277 | 0.27 | 0.27 | 0.27 |
| 0.32 | 0.27 | 0.27 | 0.27 |
| 0.36 | 0.27 | 0.27 | 0.27 |

TABLE 2

Outlet Window Coordinates in Centimeters

| X(cm) | Y1 (cm) | Y2 (cm) | Y3 (cm) |
|-------|---------|---------|---------|
| 0.0000 | 0.0000 | | 0.0000 |
| 0.0000 | 0.0343 | | 0.0343 |
| 0.1727 | 0.0343 | | 0.0343 |
| 0.3048 | 0.1029 | 0.0000 | 0.0343 |
| 0.3048 | 0.0343 | 0.0343 | 0.0343 |
| 0.3429 | 0.0483 | 0.0483 | 0.0483 |
| 0.3810 | 0.0584 | 0.0584 | 0.0584 |
| 0.4318 | 0.0991 | 0.0991 | 0.0991 |
| 0.4826 | 0.1549 | 0.1549 | 0.1549 |
| 0.5334 | 0.2184 | 0.2184 | 0.2184 |
| 0.5842 | 0.3277 | 0.3277 | 0.3277 |
| 0.6350 | 0.4775 | 0.4775 | 0.4775 |
| 0.6756 | 0.5944 | 0.5944 | 0.5944 |
| 0.7036 | 0.6858 | 0.6858 | 0.6858 |
| 0.8128 | 0.6858 | 0.6858 | 0.6858 |
| 0.9144 | 0.6858 | 0.6858 | 0.6858 |

A method of installing the metering valve assembly 150 in fuel control 102 is described herein with reference to FIGS. 1-7. The metering valve sleeve 210 is inserted into the metering valve section 110 of the fuel control housing portion 100. As previously described, the metering valve sleeve 210 includes inlet window set 211 and outlet window set 212. The outlet window set includes first outlet window 212a having a first logarithmic contour as defined in detail in Tables 1 and 2. The second outlet window 212b has a second logarithmic contour as defined in detail in Tables 1 and 2. The metering valve spool 200 is arranged within the metering valve sleeve 210. The metering valve spool 200 includes first, second, and third cylindrical portions 201, 202, and 203. The first cylindrical portion 201 and the second cylindrical portion 202 have a substantially equal first diameter D1, and the third cylindrical portion 203 has a second diameter D2. The metering valve spool 200 is arranged to establish a diametral clearance of 0.0003 and 0.0006 inches (0.000762-0.001524 cm) between inner diameter D4 of the metering valve sleeve 210 and the first diameter D1. LVDT 215 is coupled to the metering valve spool 200 and retained by containment housing 300 in the containment housing section 115.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of installing a metering valve assembly in a fuel control, the method comprising:
inserting a metering valve sleeve into a metering valve section of a fuel control housing, the metering valve sleeve comprising inlet window set and an outlet window set, the outlet window set comprising a first outlet window having a first logarithmic contour and a second outlet window having a second logarithmic contour, wherein a ratio of an inner width of the first outlet window to an inner length of the first outlet window is between 1.48 and 1.52, and a ratio of an inner width of the second outlet window to an inner length of the second outlet window is between 2.21 and 2.29; and
arranging a metering valve spool within the metering valve sleeve, the metering valve spool comprising a first cylindrical portion, a second cylindrical portion, and a third cylindrical portion formed between the first and second cylindrical portions, wherein the first cylindrical portion and the second cylindrical portion have a substantially equal first diameter, the third cylindrical portion has a second diameter, and a ratio of the first diameter to the second diameter is between 2.52 and 2.63, and the metering valve spool is arranged to establish a diametral clearance of 0.0003 and 0.0006 inches (0.000762-0.001524 cm) between an inner diameter of the metering valve sleeve and the first diameter.

2. A metering valve assembly comprising:
a metering valve sleeve comprising an inlet window set and an outlet window set, the outlet window set comprising a first outlet window having a first logarithmic contour and a second outlet window having a second logarithmic contour, wherein a ratio of an inner width of the first outlet window to an inner length of the first outlet window is between 1.48 and 1.52, and a ratio of an inner width of the second outlet window to an inner length of the second outlet window is between 2.21 and 2.29; and
a metering valve spool comprising a first cylindrical portion, a second cylindrical portion, and a third cylindrical portion formed between the first and second cylindrical portions, wherein the metering valve spool is configured to move bi-directionally along a longitudinal axis of the metering valve sleeve and control fluid flow between the inlet window set and the outlet window set relative to the first, second, and third cylindrical portions.

3. The metering valve assembly of claim 2, wherein the first cylindrical portion and the second cylindrical portion have a substantially equal first diameter, the third cylindrical portion has a second diameter, and a ratio of the first diameter to the second diameter is between 2.52 and 2.63.

4. The metering valve assembly of claim 3, wherein the metering valve sleeve has an internal diameter between 0.0003 and 0.0006 inches (0.000762-0.001524 cm) greater than the first diameter.

5. The metering valve assembly of claim 2, wherein the inlet window set comprises six substantially rectangular inlet windows, each inlet window having a ratio of a width to a length between 1.43 and 1.53.

6. The metering valve assembly of claim 2, further comprising a limiting lip formed on the metering valve spool and a limiting lip formed on the metering valve sleeve, the limiting lips configured to limit movement of the metering valve spool relative to the metering valve sleeve along the longitudinal axis.

7. The metering valve assembly of claim 6, wherein a first length is defined between the limiting lip of the metering valve sleeve and a metering valve sleeve end, a second length is defined between the limiting lip of the metering valve sleeve and the inlet window set, and a ratio of the first length to the second length is between 3.57 and 3.63.

8. The metering valve assembly of claim 7, wherein a third length is defined between the limiting lip of the metering valve sleeve and an outer edge of the first outlet window, and a ratio of the first length to the third length is between 2.03 and 2.04.

9. The metering valve assembly of claim 8, wherein a fourth length is defined between the limiting lip of the metering valve sleeve and an outer edge of the second outlet window, and a ratio of the first length to the fourth length is between 1.88 and 1.90.

10. The metering valve assembly of claim 2, wherein a ratio of an outer length of the first outlet window to an outer length of the second outlet window is between 1.15 and 1.42.

11. The metering valve assembly of claim 2, wherein the first logarithmic contour of the first outlet window is defined by a set of coordinates X, Y1, Y3 listed in Table 1 relative to an axis A of the first outlet window, and the second logarithmic contour of the second outlet window is defined by a set of coordinates X, Y2 listed in Table 1 relative to an axis A' of the second outlet window.

12. A fuel control, comprising:
a pressure regulating valve section configured to control a metered pressure of fuel; and
a metering valve section configured to meter a fuel burn flow at the metered pressure, the metering valve section including a metering valve assembly comprising:
a metering valve sleeve comprising an inlet window set and an outlet window set, the outlet window set comprising a first outlet window having a first logarithmic contour and a second outlet window having a second logarithmic contour, wherein a ratio of an inner width of the first outlet window to an inner length of the first outlet window is between 1.48 and 1.52, and a ratio of an inner width of the second outlet window to an inner length of the second outlet window is between 2.21 and 2.29; and
a metering valve spool comprising a first cylindrical portion, a second cylindrical portion, and a third cylindrical portion formed between the first and second cylindrical portions, wherein the metering valve spool is configured to move bi-directionally along a longitudinal axis of the metering valve sleeve and control the fuel burn flow between the inlet window set and the outlet window set relative to the first, second, and third cylindrical portions.

13. The fuel control of claim 12, wherein the first cylindrical portion and the second cylindrical portion have a substantially equal first diameter, the third cylindrical portion has a second diameter, and a ratio of the first diameter to the second diameter is between 2.52 and 2.63.

14. The fuel control of claim 13, wherein the metering valve sleeve has an internal diameter between 0.0003 and 0.0006 inches (0.000762-0.001524 cm) greater than the first diameter.

15. The fuel control of claim 12, wherein the inlet window set comprises six substantially rectangular inlet windows, each inlet window having a ratio of a width to a length between 1.43 and 1.53.

16. The fuel control of claim 12, further comprising a limiting lip formed on the metering valve spool and a limiting lip formed on the metering valve sleeve, the limiting lips configured to limit movement of the metering valve spool relative to the metering valve sleeve along the longitudinal axis.

17. The fuel control of claim 16, wherein a first length is defined between the limiting lip of the metering valve sleeve and a metering valve sleeve end, a second length is defined between the limiting lip of the metering valve sleeve and the inlet window set, and a ratio of the first length to the second length is between 3.57 and 3.63.

18. The fuel control of claim 17, wherein a third length is defined between the limiting lip of the metering valve sleeve and an outer edge of the first outlet window, and a ratio of the first length to the third length is between 2.03 and 2.04; and
   wherein a fourth length is defined between the limiting lip of the metering valve sleeve and an outer edge of the second outlet window, and a ratio of the first length to the fourth length is between 1.88 and 1.90.

19. The fuel control of claim 12, wherein a ratio of an outer length of the first outlet window to an outer length of the second outlet window is between 1.15 and 1.42.

20. The fuel control of claim 12 further comprising a containment housing section including a containment housing and a linear variable differential transformer coupled to the metering valve spool, wherein movement of the metering valve spool within the metering valve sleeve in one direction along the longitudinal axis is limited by the containment housing.

\* \* \* \* \*